US012454157B2

(12) United States Patent
Souyri et al.

(10) Patent No.: US 12,454,157 B2
(45) Date of Patent: Oct. 28, 2025

(54) SNOW COVER FOR TIRES

(71) Applicants: Philippe Souyri, Clermont-Ferrand (FR); Emmanuel Igier, Clermont-Ferrand (FR); Compagnie Generale des Etablissements Michelin, Clermont-Ferrand (FR)

(72) Inventors: Philippe Souyri, Clermont-Ferrand (FR); Emmanuel Igier, Clermont-Ferrand (FR)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 790 days.

(21) Appl. No.: 17/783,152

(22) PCT Filed: Dec. 30, 2019

(86) PCT No.: PCT/IB2019/061440
§ 371 (c)(1),
(2) Date: Jun. 7, 2022

(87) PCT Pub. No.: WO2021/136955
PCT Pub. Date: Jul. 8, 2021

(65) Prior Publication Data
US 2023/0018076 A1     Jan. 19, 2023

(51) Int. Cl.
*B60C 27/18* (2006.01)
*B32B 1/08* (2006.01)
(Continued)

(52) U.S. Cl.
CPC ............... *B60C 27/18* (2013.01); *B32B 1/08* (2013.01); *B32B 3/02* (2013.01); *B32B 3/06* (2013.01);
(Continued)

(58) Field of Classification Search
None
See application file for complete search history.

(56) References Cited

U.S. PATENT DOCUMENTS 1,198,552 A * 9/1916 Hutchison ............... B60C 27/06
                                                    301/38.1
1,388,264 A * 8/1921 Keavey ................... B60C 27/16
                                                    152/170
(Continued)

FOREIGN PATENT DOCUMENTS

CN     102218979 A  * 10/2011
CN     106515327 A  *  3/2017  ............. B60C 27/06
(Continued)

OTHER PUBLICATIONS

Machine Translation of WO2007099127A1, Sep. 2007 (Year: 2007).*
(Continued)

*Primary Examiner* — Jeffrey A Vonch
(74) *Attorney, Agent, or Firm* — Neal P. Pierotti

(57) ABSTRACT

A snow sock is provided that includes a covering that extends in a circumferential direction. The covering has a thickness and an outer surface. A first thickness section is present and extends along a first arc length, and has a first thickness section inner surface that engages the outer surface of the covering. At least 50% of the first thickness section inner surface engages the outer surface of the covering and/or a first fill element. A second thickness section is also provided and is spaced from the first thickness section. The second thickness section extends in the circumferential direction along a second arc length, and has a second thickness section inner surface that engages the outer surface of the covering. At least 50% of the second thickness section inner surface engages the outer surface of the covering and/or a second fill element.

15 Claims, 6 Drawing Sheets

(51) Int. Cl.
*B32B 3/02* (2006.01)
*B32B 3/06* (2006.01)
*B32B 3/08* (2006.01)
*B32B 3/30* (2006.01)
*B32B 5/02* (2006.01)

(52) U.S. Cl.
CPC ............... *B32B 3/08* (2013.01); *B32B 3/085* (2013.01); *B32B 3/30* (2013.01); *B32B 5/02* (2013.01); *Y10T 428/13* (2015.01); *Y10T 428/17* (2015.01); *Y10T 428/18* (2015.01); *Y10T 428/197* (2015.01); *Y10T 428/24479* (2015.01); *Y10T 428/24587* (2015.01); *Y10T 428/24612* (2015.01); *Y10T 428/24777* (2015.01); *Y10T 428/24785* (2015.01)

(56) References Cited

U.S. PATENT DOCUMENTS

| | | | | |
|---|---|---|---|---|
| 1,455,412 A * | 5/1923 | Scheuner | B60C 27/16 152/173 |
| 1,568,581 A * | 1/1926 | Albert | B60C 27/16 152/222 |
| 1,696,903 A * | 1/1929 | Courtadon | B60C 27/10 152/179 |
| 1,719,746 A * | 7/1929 | Baker | B60C 27/02 152/218 |
| 1,884,283 A * | 10/1932 | Schneider, Jr. | B60C 27/16 152/221 |
| 2,208,593 A * | 7/1940 | Mccurley | B60C 27/16 206/304.2 |
| 2,262,349 A * | 11/1941 | Webster | B60C 27/00 D12/608 |
| 2,348,256 A * | 5/1944 | Hollis | B60C 27/16 152/185 |
| 2,392,577 A * | 1/1946 | Castricum | B60C 27/18 152/212 |
| 2,535,299 A * | 12/1950 | Leach | B60C 27/16 152/186 |
| 2,571,020 A * | 10/1951 | Earl, Sr. | B60C 27/08 D12/608 |
| 3,031,000 A * | 4/1962 | Sebena | B60C 27/18 152/218 |
| 3,080,906 A * | 3/1963 | Payne | B60C 27/16 152/175 |
| 3,233,646 A * | 2/1966 | Sebena | B60C 27/18 152/218 |
| 3,323,572 A * | 6/1967 | Farah | B60C 27/02 152/208 |
| 3,506,051 A * | 4/1970 | Mathews | B60C 27/16 152/216 |
| D233,516 S * | 11/1974 | Beadle | D12/608 |
| 3,937,262 A * | 2/1976 | Lee | B60C 27/02 156/96 |
| 5,454,413 A * | 10/1995 | Morelli | B60C 27/20 152/225 C |
| 5,624,509 A * | 4/1997 | Stanley | B60C 27/16 152/175 |
| 6,860,304 B1 * | 3/2005 | Dalrymple | B60C 27/18 152/219 |
| 2004/0206436 A1 * | 10/2004 | Ferguson | B60C 11/16 152/217 |
| 2006/0011281 A1 * | 1/2006 | Roca | B60C 27/18 152/216 |
| 2006/0090825 A1 * | 5/2006 | Lotveit | B60C 27/18 152/170 |
| 2006/0157176 A1 * | 7/2006 | Morgese | B60C 27/22 152/185 |
| 2009/0025845 A1 * | 1/2009 | Uemura | B60C 27/16 152/221 |
| 2009/0145530 A1 * | 6/2009 | Lammon | B60C 27/18 152/226 |
| 2009/0301624 A1 * | 12/2009 | Maritano | D04B 21/12 152/221 |
| 2010/0018620 A1 * | 1/2010 | Joubert | B60C 27/18 152/222 |
| 2017/0015160 A1 * | 1/2017 | Curry | B60C 27/20 |
| 2019/0126695 A1 * | 5/2019 | Heuett | B60C 27/066 |

FOREIGN PATENT DOCUMENTS

| | | | | |
|---|---|---|---|---|
| DE | 518866 C * | 2/1931 | | |
| DE | 102008013230 A1 * | 9/2009 | ............. | B60C 27/18 |
| DE | 102008037701 A1 * | 2/2010 | ............. | B60C 27/18 |
| DE | 102008047071 A1 * | 3/2010 | ............. | B60C 27/18 |
| DE | 102011008411 A1 * | 7/2012 | ............. | B60C 27/22 |
| EP | 1349738 B1 * | 11/2006 | ............. | B60C 27/08 |
| EP | 1859969 A1 * | 11/2007 | ............. | B60C 27/12 |
| EP | 2006127 A2 * | 12/2008 | ............. | B60C 27/18 |
| EP | 2125395 B1 * | 5/2011 | ............ | B24D 11/005 |
| EP | 2689941 A1 * | 1/2014 | ............. | B60C 27/18 |
| FR | 344888 A * | 11/1904 | | |
| FR | 347992 A * | 3/1905 | | |
| FR | 353529 A * | 9/1905 | | |
| FR | 418384 A * | 12/1910 | | |
| FR | 778818 A * | 3/1935 | | |
| FR | 1075530 A * | 10/1954 | | |
| FR | 1482243 A * | 5/1967 | | |
| FR | 2437307 A1 * | 4/1980 | | |
| FR | 2537060 A1 * | 6/1984 | ............. | B60C 27/00 |
| FR | 2579143 A1 * | 9/1986 | ............. | B60C 27/16 |
| FR | 2898079 A1 | 9/2007 | | |
| FR | 2912686 A1 * | 8/2008 | ............. | B60C 27/18 |
| FR | 2912687 A1 * | 8/2008 | ............. | B60C 27/18 |
| FR | 2912958 A1 * | 8/2008 | ............. | B60C 27/18 |
| FR | 2912959 A1 * | 8/2008 | ............. | B60C 27/18 |
| GB | 388689 A * | 3/1933 | ............. | B60C 27/00 |
| GB | 1017198 A * | 1/1966 | ............. | B60C 27/16 |
| GB | 2152449 A * | 8/1985 | ............. | B60C 27/16 |
| GB | 2493697 A | 2/2013 | | |
| JP | 59104803 U * | 7/1984 | | |
| JP | 60067202 A * | 4/1985 | | |
| KR | 20040075137 A * | 8/2004 | | |
| KR | 20040091223 A * | 10/2004 | | |
| KR | 101181450 B1 * | 9/2012 | ............. | B60C 27/06 |
| KR | 1221027 B1 * | 1/2013 | | |
| KR | 20140007677 A * | 1/2014 | ............. | B60C 27/20 |
| KR | 200471272 Y1 * | 2/2014 | ............. | B60C 27/18 |
| KR | 200471421 Y1 * | 2/2014 | ............. | B60C 27/06 |
| KR | 200474214 Y1 * | 9/2014 | ............. | B60C 27/20 |
| KR | 20170022312 A * | 3/2017 | ............. | B60C 27/00 |
| WO | 2006129147 A1 | 12/2006 | | |
| WO | WO-2007066022 A1 * | 6/2007 | ............. | B60C 27/18 |
| WO | WO-2007099127 A1 * | 9/2007 | ............. | B60C 27/18 |
| WO | WO-2015087478 A1 * | 6/2015 | ............ | B60C 27/066 |
| WO | WO-2016068396 A1 * | 5/2016 | ............. | B60C 27/18 |
| WO | WO-2021009415 A1 * | 1/2021 | ............. | B60C 27/06 |

OTHER PUBLICATIONS

Machine Translation of FR2912686A1, Aug. 2008 (Year: 2008).*
Machine Translation of FR2912687A1, Aug. 2008 (Year: 2008).*
Machine Translation of DE102008013230A1, Sep. 2009 (Year: 2009).*
Tire Size Chart, <https://tiresize.com/chart>, Apr. 2016 (Year: 2016).*
European Patent Office, International Search Report dated Aug. 18, 2020, pp. 1-10 (included), European Patent Office, Rijswijk, The Netherlands.

* cited by examiner

SNOW COVER FOR TIRES

CROSS-REFERENCE TO RELATED APPLICATIONS

The present application is a 35 U.S.C. § 371 application of PCT/IB2019/061440 filed on Dec. 30, 2019 and entitled "Snow Cover for Tyres." PCT/US2019/061440 is incorporated by reference herein in its entirety for all purposes.

FIELD OF THE INVENTION

The present invention relates generally to snow socks that fit over tires of vehicles to provide additional traction on ice and snow. More particularly, the present application involves a snow sock that includes multiple thickness sections located around the circumference of the covering that function to increase traction performance of the snow sock when operating on ice and snow.

BACKGROUND

Snow socks are devices generally made of fabric that wrap around tires of a vehicle to increase traction on snow and ice. The fabric portion covers the tread of the tire, and elastic straps are incorporated to help retain the snow sock onto the sides of the tire and assist in removal. Snow socks are distinguished from snow chains in that they do not include chains, and are typically less damaging to the road surface. In constructing snow socks, fabric is supplied on rolls from which it is unwound to produce the covering portion of the snow sock that engages the road. The desired amount of fabric is unwound from the roll and cut as needed. The fabric is wrapped around itself and the ends are joined at a junction. However, there will be left over fabric on the roll as the roll becomes depleted due to the fact that the needed length of the fabric is greater than the last remaining amount of fabric on the roll. This left over fabric will be wasted because it is not long enough to form the necessary circumferential length of the snow sock covering. In addition to eliminating waste in the construction of a snow sock, it may be the case that the performance of a snow sock on snow and ice could be improved. As such, there remains room for variation and improvement within the art.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended FIGS. in which.

Figure 1:
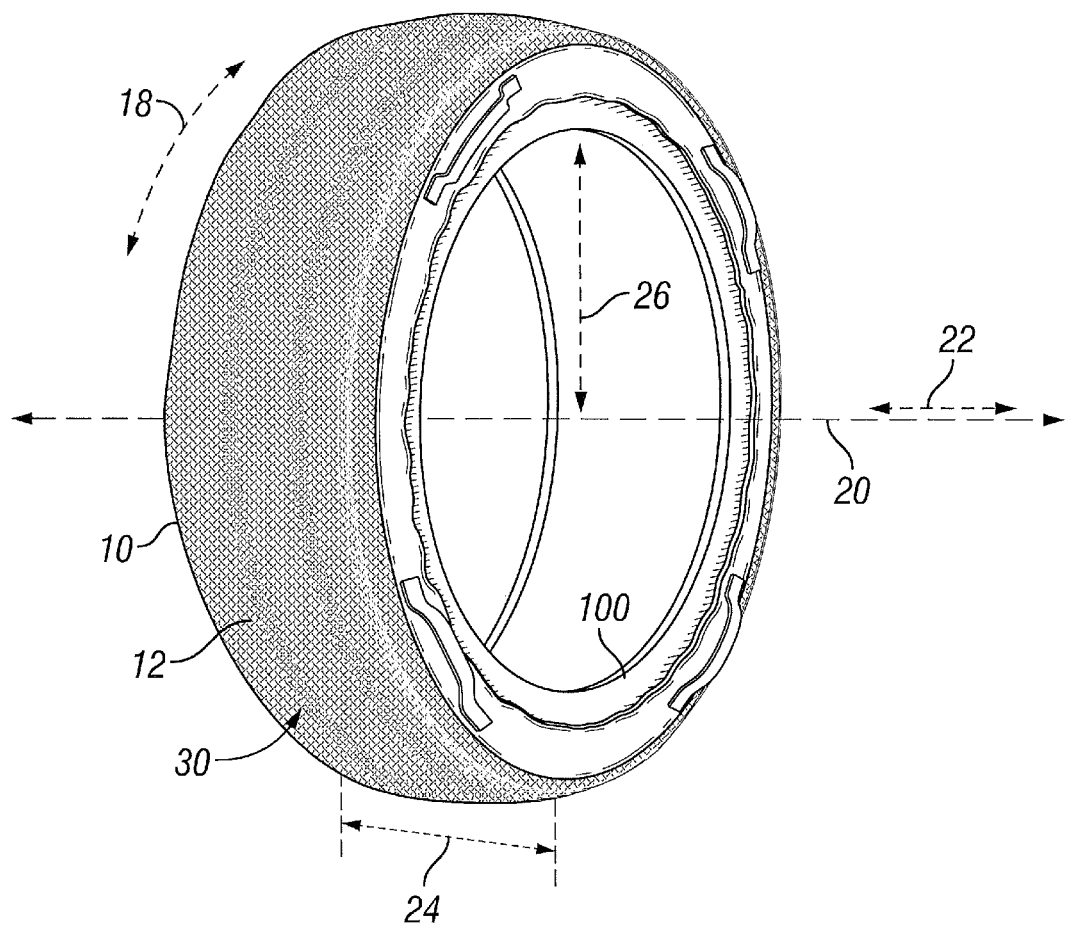
FIG. 1 is a perspective view of a snow sock on a tire.

Repeat use of reference characters in the present specification and drawings is intended to represent the same or analogous features or elements of the invention.

DETAILED DESCRIPTION OF REPRESENTATIVE EMBODIMENTS

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

A snow sock 10 is provided that is used for enhancing the traction of vehicles on snow and ice, especially at lower speeds after initial movement of the vehicle. The snow sock 10 includes a covering 12 that covers the outer surface of the tread of the tire 100 of the vehicle. At least two thickness sections 12, 16 are present and may be made of the same material as the covering 12, or could be made out of a different material. For example in some embodiments the covering 12 may be made out of fabric, and the first and second thickness sections 12, 16 may be made of rubber. The two thickness sections 12, 16 in effect extend the thickness of the snow sock 10 due to their presence at these locations, and they cause for increased traction of the snow sock 10 and tire 100 on ice and snow. If additional thickness sections, such as third and fourth thickness sections 68 and 76, are present on the covering 12 they will cause yet additional traction increases. The thickness sections 16, 18 could be located at portions of the covering 12 that are discontinuous from one another and thus function to attach the portions of the covering 12 to itself at these discontinuities. Also, the thickness sections 16, 18 could be located at continuous portions of the covering 12 so they do not function to attach discontinuous sections of the covering 12, but still function to increase traction performance of the snow sock 10.

With reference to FIG. 1, a tire 100 is illustrated in perspective view with a snow sock 10 attached to the tire 100 and covering the tread of the tire 100. The snow sock 10 can be described with geometrical properties that it takes as positioned onto the tire 100. The snow sock 10 has a central axis 20 that is coaxial with the axis of rotation of the tire 100. The central axis 20 thus extends through the center of the tire 100 and is aligned in the axial direction 22. The radial direction 26 of the snow sock 10 extends outward from the central axis 20 and is perpendicular to the central axis 20. The snow sock 10 also has a circumferential direction 18 that extends around the circumference of the snow sock 10 and circles the central axis 20. The circumferential direction 18 may be located at any distance from the central axis 20 in the radial direction 26 of the snow sock 10, and need not be located only at the outer surface 30 or sidewall section of the snow sock 10 in the radial direction 26.

Figure 2:
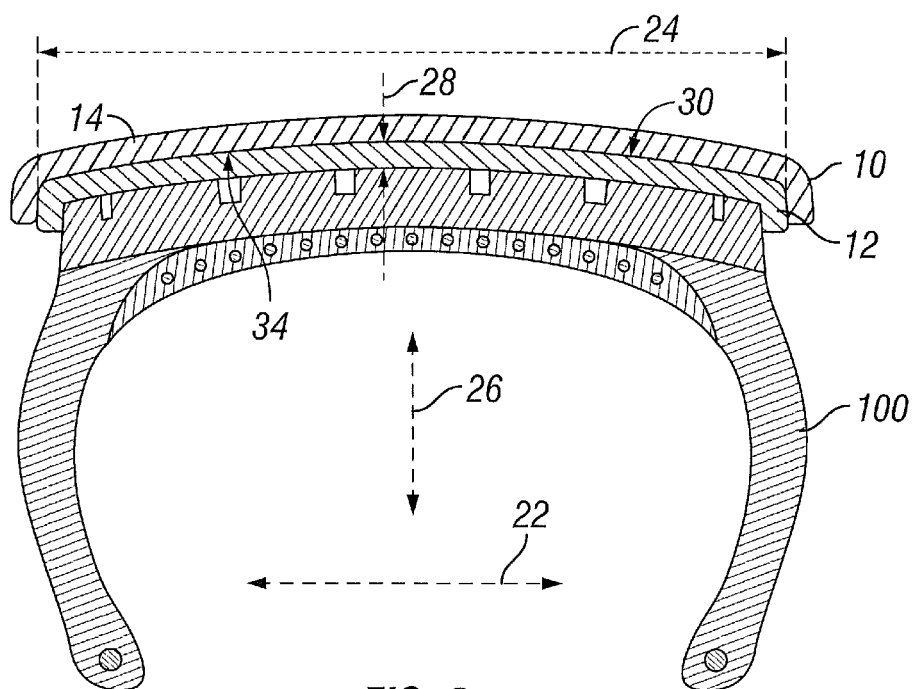
FIG. 2 is a cross-sectional view taken along line 2-2 of FIG. 3.
Figure 3:
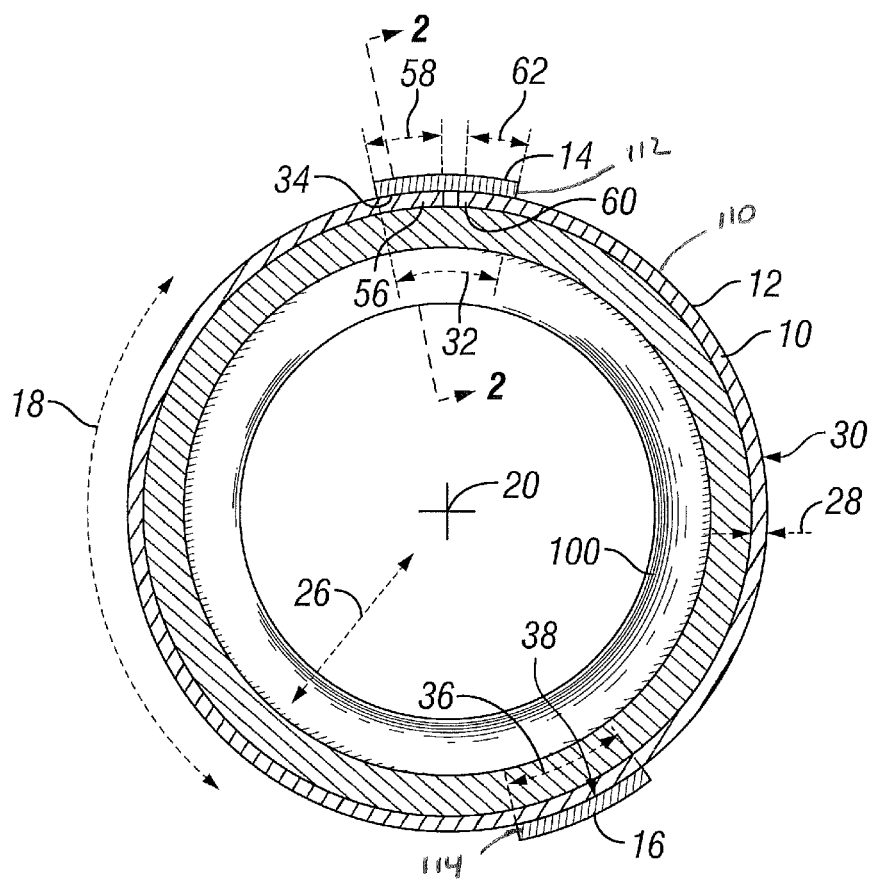
FIG. 3 is a cross-sectional side view of a snow sock on a tire.

The covering 12 of the snow sock is positioned on opposite sides of the tread of the tire 100 in the axial direction 22. FIG. 2 shows the covering 12 engaging opposite sides of the tread in the axial direction 22, but it could extend downward to engage opposite sidewalls of the tire 100 in other embodiments. The covering 12 has a width 24 that extends in the axial direction 22, and this width 24 may extend across the entire width of the tread of the tire 100 in the axial direction 22. Tabs on the side of the snow sock 10 can be used to help secure the covering 12 to the tire 100, and to remove the covering 12 from the tire 100 when it is no longer needed. The covering 12 may stretch so as to be secured to the tire 100 and can extend 360 degrees around the entire circumference of the tire 100. The first thickness section 14 does not engage the tire 100, but could in other embodiments. FIG. 3 is a cross-sectional side view of one embodiment of the snow sock 10 on a tire 100, with FIG. 2 being a cross-sectional view taken along line 2-2 of FIG. 3. The covering 12 is a single component that extends around the circumference of the tire 100 such that a leading portion 56 is positioned adjacent its tailing portion 60. The leading and tailing portions 56, 60 could engage and even overlap one another, or the leading and tailing portions 56, 60 could be free from contact with one another and located a distance from one another in the circumferential direction 18. The leading portion 56 extends an arc length 58 in the circumference direction 18 that can be 5 degrees. Similarly, the tailing portion 60 extends an arc length 62 about the circumferential direction 18 that can be 5 degrees. The leading and tailing portions 56, 60 extend from the two terminal ends of the covering 12.

The leading and tailing portions 56, 60 are connected to one another via the first thickness section 14 that has a first thickness section inner surface 34 that engages the outer surface 30 of the covering 12. The first thickness section 14 is attached to both the leading and tailing portions 56, 60 which in turn causes them to be attached to one another via the first thickness section 14. The covering 12 is thus attached to itself around the tire 100, and the first thickness section 14 acts to increase the thickness of the snow sock 10 at the connection point between the portions 56, 60. The covering 12 has a thickness 28 which is its length in the radial direction 26. The thickness of the first thickness section 14 could be the same as the thickness 28, or may be greater or less than that of the thickness 28 in various embodiments. The first thickness section 14 extends a first arc length 32 in the circumferential direction 18. The first arc length 32 may be from 3 to 15 degrees in accordance with certain exemplary embodiments, and may extend entirely along both of the arc lengths 58 and 62. In addition to attaching the covering 12, the first thickness section 14 increase traction of the snow sock 10 on ice and snow due to its presence on the covering 12.

The snow sock 10 also includes a second thickness section 16 that is attached to the outer surface 30. The second thickness section 16 has a second thickness section inner surface 38 that engages the outer surface 30. The second thickness section 16 extends a second arc length 36 in the circumferential direction 18, and the second arc length 36 may be the same length as the first arc length 32. The second thickness section 16 is free from engagement with, and is spaced in the circumferential direction 18 from the first thickness section 14. The second thickness section 16 can be located at any position about the circumference of the snow sock 10 and need not be 180 degrees disposed from the first thickness section 14 in the circumferential direction 18. The second thickness section 16 may be made of the same material as the first thickness section 14. The second thickness section 16 functions to add increased thickness to the snow sock 10 by adding thickness to the thickness 28 due to its presence on the covering 12. The second thickness section 16 is not located at tailing and leading portions 60, 56 of the covering 12, but is instead located at a portion of the covering 12 that is continuous. As such, the second thickness section 16 does not function to attach portions of the covering 12 together. The second thickness section 16 increases traction of the snow sock 10 on ice and snow due to its presence in adding additional thickness to the snow sock 10 at its location.

The first and second thickness section 14, 16 may be located on the outer surface 30 so that they engage the outer surface 30. The first and second thickness sections 14, 16 can be engaged along their entire arc lengths 32, 36 to the outer surface 30. The engagement between the first thickness section 14 and the covering 12 is arranged so that voids are minimized in that greater than 50% of the first arc length 32 of the first thickness section 14 and the covering 12 do not define a void. In this regard, at least 50% of the first thickness section inner surface 34 engages the outer surface 30, a first fill element 40, or a combination of the outer surface 30 and the first fill element 40. In a similar manner, the second thickness section 16 and the covering 12 are arranged so that greater than 50% of the second arc length 36 of the second thickness section 16 and the covering 12 do not define a void. In this regard, at least 50% of the second thickness section inner surface 38 engages the outer surface 30, a second fill element 44, or a combination of the outer surface 30 and the second fill element 44. In some embodiments, at least 90% of the inner surfaces 34, 38 engage the outer surface 30, the fill elements 40, 44 or a combination as stated. In some instances, no voids are defined by the thickness sections 14, 16 and the covering 12. In other instances, voids are defined but they are less than 50% of the first arc length 32 and are less than 50% of the second arc length 36. The voids, if present, could be defined by the outer surface 30 and the thickness sections 14, 16. Additionally or alternatively, the voids could be said to be defined by the portion of the space that separates the two covering segments 64, 66 and if this is the case less than 50% of the arc lengths 32, 36 would be used to define these voids.

The thickness sections 14, 16 could be attached to the covering 12 by stitching, adhesives, mechanical fasteners, integral formation, sonic welding, or any other mechanism. The arc lengths 32, 36 could extend a length in the circumferential direction 18 such that they extend 3 degrees or greater in the circumferential direction 18 about the central axis 20. In other embodiments, the arc lengths 32, 36 could extend from 2 to 6 degrees in the circumferential direction 18 about the central axis 20. In yet other embodiments, the arc lengths 32, 36 may extend from 1 to 10 degrees in the circumferential direction 18 about the central axis 20. The thickness sections 14, 16 may be successive thickness sections on the outer surface 20 in the circumferential direction 18, and may be spaced from one another in the circumferential direction 18 an amount greater than 50 degrees, greater than 30 degrees, greater than 20 degrees, or greater than 10 degrees in accordance with various exemplary embodiments. The thickness sections 14, 16 are described as being successive in that there are no other thickness sections, objects, or features on the outer surface 30 between the first thickness section 14 and the second thickness section 16 this section of the outer surface 30 being the one that is measured as being greater than 50, 30, 20, or 10 degrees in accordance with various embodiments.

Figure 4:
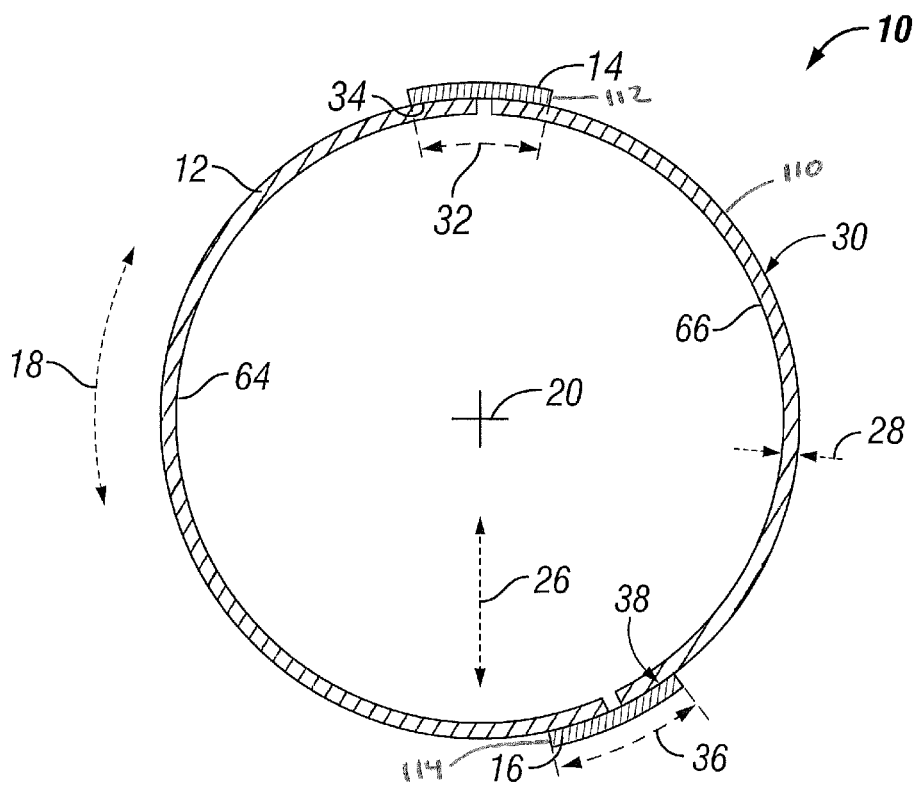
FIG. 4 is a cross-sectional side view of a snow sock with a covering having two covering segments and attached via two thickness sections.

If the covering 12 is fabric wound onto a roll it may be the case that at the end of the roll sufficient length of the fabric is not present to extend the full 360 degree circumferential length, thus causing this last bit of material to go to waste. In some embodiments of the snow sock 10, this waste can be eliminated if this last remaining portion of fabric is used with another portion of fabric to form a snow sock 10 with a covering 12 made of a first covering segment 64 and a second covering segment 66. FIG. 4 shows one embodiment in which the covering 12 is made of two covering segments 64 and 66. The first covering segment 64 extends a longer length in the circumferential direction 18 than does the second covering segment 66. The first thickness section 14 is located at the junction of the covering segments 64, 66 and functions to attach the covering segments 64, 66 at this location. At the other junction of the first and second covering segments 64, 66, the second thickness section 16 is located on the outer surface 30 and engages both of the covering segments 64, 66 to attach them to one another at this point as well. The two thickness sections 14, 16 do not engage one another, and do not share a common position in the snow sock 10 in the circumferential direction 18. The two covering segments 64, 66 are shown as being separated from one another and not in engagement with one another, but in other embodiments they may contact one another or even overlap one another at one or both of their junction points. The resulting snow sock 10 may thus eliminate fabric waste in that the extra portion of fabric makes up the first or second covering segment 64, 66. As previously stated, if the material making up the covering 12 is provided on a roll, or otherwise as a longer amount of material, some amount of excess material will remain once the rest of the material is cut to the desired lengths to form the coverings 12 of the snow socks 10. This extra, left over portion of material can be saved from being thrown out because it can be added into the covering 12 and attached to another piece, thus being the first and second covering segments 64, 66, that is cut to the necessary length.

The covering 12 could be made of any type of fabric. In some embodiments, the covering 12 may be made of a continuous multifilament polypropylene yarn. The fabric could additionally include materials such an aramid fiber or textile steel. Although described as being a fabric, the covering 12 need not be made of a fabric in other embodiments. The covering 12 could be made of could be any type of material such as plastic, cloth, cotton, hemp, metal, or rubber in accordance with other embodiments. Also, the thickness sections 14, 16, 68, 76, 82, 88, 94 could be made of the same material as the covering 12, a different material from the covering 12, any of the materials listed, or may be made of materials different from one another so that different thickness sections 14, 16, 68, 76, 82, 88, 94 are made of different materials. The snow sock 10 may be provided so that it does not include a chain. Further, the snow sock 10 in some exemplary embodiments does not include any metal components.

Figure 5:
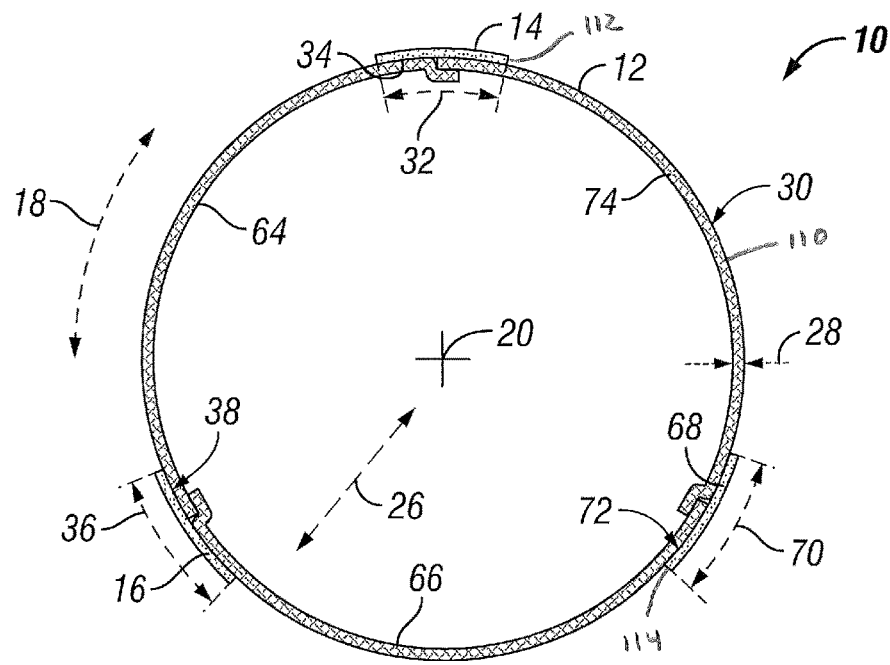
FIG. 5 is a cross-sectional side view of a snow sock with a covering made of three covering segments and attached via thickness sections.

The covering 12 may be made up of any number of covering segments in accordance with other exemplary embodiments. FIG. 5 shows another embodiment in which the covering 12 is composed of three covering segments 64, 66, 74. The covering segments 64, 66, 74 all have the same lengths in the circumferential direction 18. The first thickness section 14 is used to attach the first covering segment 64 to the third covering segment 74 and is located at their junction and the two segments 64, 74 overlap and touch one another. The second thickness section 16 is located at the junction of the first covering segment 64 and the second covering segment 66 and attaches them together at this location. A third thickness section 68 attaches the second covering segment 66 to the third covering segment 74. The third thickness section 68 has a length that extends a third arc length 70 about the circumferential direction 18, and the third arc length 70 may be the same length as the first and second arc lengths 32, 36. The third thickness section 68 has a third thickness section inner surface 72 that engages the outer surface 30 and both the second and third covering segments 66, 74. The third thickness section 68 is spaced from and free from engagement with both the first and second thickness sections 14, 16 and is located at a position on the snow sock 10 that is not the same in the circumferential direction as any of the circumferential positions of the first and second thickness sections 14, 16.

The third thickness section 68 engages the second and third covering segments 66, 74 so that greater than 50% of the third arc length 70 does not define with the covering 12 a void. In this regard, at least 50% of the third thickness section inner surface 72 engages the outer surface 30, a third fill element, or a combination of the outer surface and the third fill element. No void is present at all along the third arc length 70 in the FIG. 5 embodiment. The third thickness section 68 increases the thickness of the snow sock 10 at its attachment location on the covering 12 and in turn increases traction of the snow sock 10 on ice and snow during use. Arrangement so that less than 50% of the arc lengths 32, 36, 70 of the thickness sections 14, 16, 68 define a void causes the thickness sections 14, 16, 68 to be arranged so that they may better grip the engaged surfaces to increase traction of the snow sock 10 during travel of the vehicle.

Figure 6:
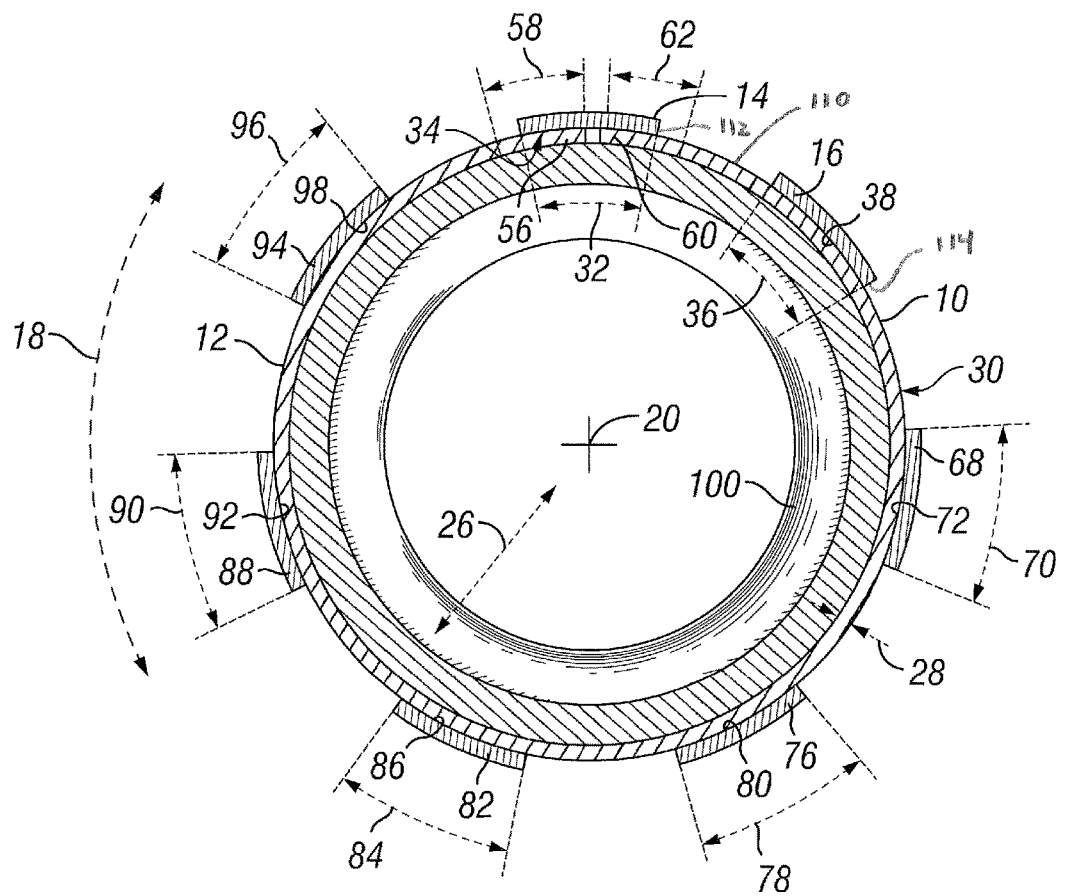
FIG. 6 is a cross-sectional side view of a snow sock on a tire that has seven thickness sections positioned about its circumference.

The snow sock 10 may include two or more thickness sections. In the embodiment shown in FIG. 6, seven thickness sections are included. The snow sock 10 is located on a tire 100 and has but a single covering segment that makes up the covering 12. The first thickness section 14 attaches the leading and tailing portions 56, 60 together, and the remaining thickness sections are not used to attach the covering 12 together, but do provide additional traction to the snow sock 10. The second and third thickness sections 16, 68 are located on the outer surface 30. A fourth thickness section 76 extends a fourth arc length 78 in the circumferential direction 18, and has a fourth thickness section inner surface 80 that engages the outer surface 30. A fifth thickness section 82 extends a fifth arc length 84 about the circumferential direction 18, and has a fifth thickness section inner surface 86 that engages the outer surface 30. A sixth thickness section 88 extends a sixth arc length 90 about the circumferential direction 18, and has a sixth thickness section inner surface 92 that engages the outer surface 30. Further, a seventh thickness section 94 extends a seventh arc length 96 in the circumferential direction 18, and has a seventh thickness section inner surface 98 that engages the outer surface 30.

The fourth through seventh thickness sections 76, 82, 88, 94 can be arranged with respect to the covering 12 in the same manners as previously described with respect to the first through third thickness sections 14, 16, 68. In this regard, greater than 50% of the fourth arc length 78 of the fourth thickness section 76 does not define with the covering 12 a void. In this regard, at least 50% of the fourth thickness section inner surface engages the outer surface 30, a fourth fill element, or a combination of the outer surface 30 and the fourth fill element. In a similar manner, greater than 50% of the fifth, sixth, and seventh arc lengths 84, 90, 96 do not define with the covering 12 a void. This can again be described by saying that at least 50% of each of the inner surfaces 86, 92, 98 engage the outer surface 30, a fill element, or a combination of the outer surface 30 and a fill element. The thickness sections 14, 16, 68, 76, 82, 88, 94 are positioned around the circumference of the covering 12 so that none of them share any common positioning/overlap with another one in the circumferential direction 18. Further, the thickness sections 14, 16, 68, 76, 82, 88, 94 do not engage one another, and may be spaced an equal amount from successive ones in the circumferential direction 18. The presence of seven thickness sections 14, 16, 68, 76, 82, 88, 94 increases traction of the snow sock 10 due to the increased thickness of the snow sock 10 at their locations. Adding additional thickness sections 14, 16, 68, 76, 82, 88, 94 at different locations on the covering 12 in the circumferential direction 18 increases traction of the snow sock 10 on snow and ice so that each additional one of the thickness sections 14, 16, 68, 76, 82, 88, 94 that is added causes an additional increase in traction. Although shown as being evenly distributed around the circumference of the covering 12, the various thickness sections 14, 16, 68, 76, 82, 88, 94 could be unevenly distributed about the circumference of the covering 12 in other embodiments. As with other embodiments, thickness sections 16, 68, 76, 82, 88, 94 could be added in order to increase traction of the snow sock 10 instead of being used to effect joining of portions of the covering 12 to one another.

Figure 7:
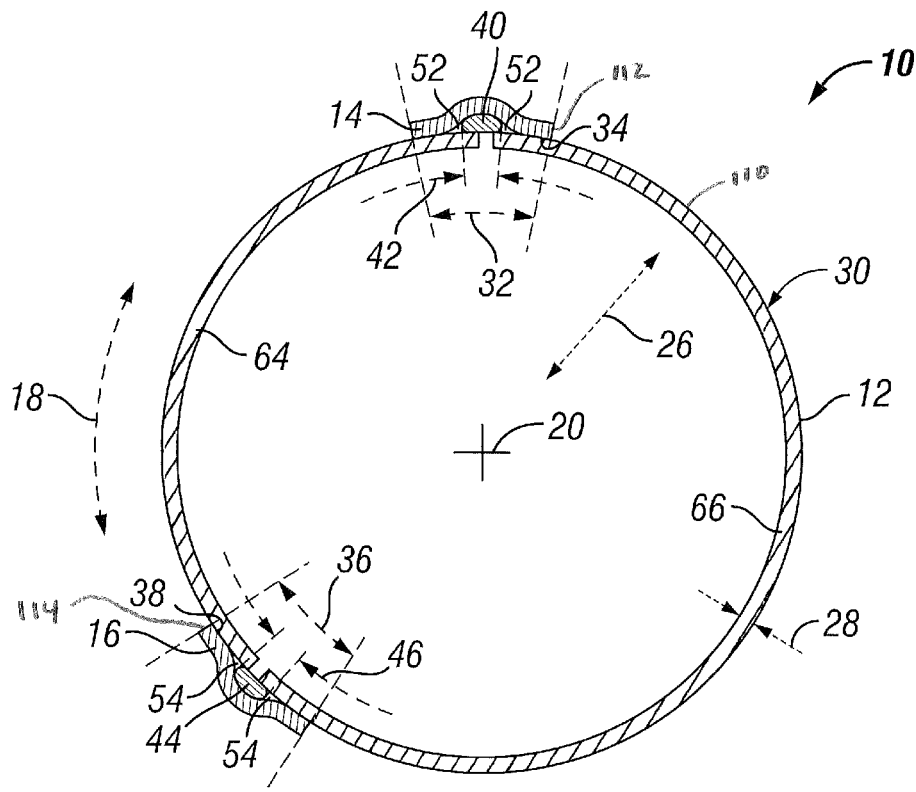
FIG. 7 is a cross-sectional side view of a snow sock with a covering made of two covering segments with two fill elements present with the thickness sections.

Other embodiments of the snow sock 10 are possible. FIG. 7 shows an alternative embodiment in which the snow sock 10 includes first and second fill elements 40, 44. The fill elements 40, 44 may be made of a different material than the thickness sections 14, 16 and the covering 12, or may be made out of the same material as one or more of these elements 12, 14, 16. In some embodiments, the fill elements 40, 44 are made of plastic that is crush resistant so that they can withstand being compressed by weight of the vehicle. The covering 12 is made of first and second covering segments 64, 66 and they are attached to one another at their ends via the first and second thickness sections 12, 15. The first fill element 40 is located between the covering 12 and the first thickness section 14 and has a length 42 that extends in the circumferential direction 18. The first thickness section 14 has a first arc length 32 that extends across the entire length 42 such that the entire first fill element 40 is covered by the first thickness section 14. The first fill element 40 engages the outer surface 30 and contacts both of the covering segments 64, 66. The first fill element 40 may be attached via adhesion, mechanical fasteners, or integral formation to the covering 12 and/or first thickness section 14 and increase the thickness of the snow sock 10 at its location. The arrangement of the covering 12, first thickness section 14, and first fill element 40 may result in the formation of a void 52. The void 52 may be present on both sides of the first fill element 40 in the circumferential direction 18 such that it is not a completely continuous void. The length of the first arc length 32 that defines the void 52 is less than 50% of the total length of the first arc length 32. In this regard, some of the length of the first arc length 32 is responsible for defining a void, but less than half of the overall length of the first arc length 32 defines a void and the other portions are engaged against the covering 12 or other component.

The second fill element 44 is located at the other junction of the first and second covering segments 64, 66 and is spaced from and not in contact with the first fill element 40. The second fill element 44 extends a length 46 in the circumferential direction 18. The second thickness section 16 overlays the second fill element 44 such that the second arc length 36 extends across the entire length 46. The second fill element 44 engages the outer surface 30 and contacts both the first and second covering segments 64, 66 in addition to the second thickness section 16. The second thickness section 16, the covering 12, and the second fill element 44 define a void 54. The void 54 is located on both sides of the second fill element 44 in the circumferential direction 18 and is not a continuous void 54. The amount of the length of the second arc length 36 that defines the void 54 is less than 50% of the total length of the second arc length 36. The second fill element 44 is not located 180 degrees from the first fill element 40 in the circumferential direction 18, and the first and second covering segments 64, 66 are of different lengths in the circumferential direction 18. Although described as having voids 52, 54 on opposite sides of the fill elements 40, 44, in other embodiments these voids 52, 54 need not be present. In yet other embodiments, the voids 52, 54 could be on but a single side of their respective fill elements 40, 44 in the circumferential direction 18. The second fill element 44 functions to increase the thickness of the snow sock 10 at its location, and this may help the snow sock 10 achieve greater traction performance when moving on ice and snow. The first and second fill elements 40, 44 may be arranged so that no portion of them extends through the first or second thickness sections 14, 16.

Figure 8:
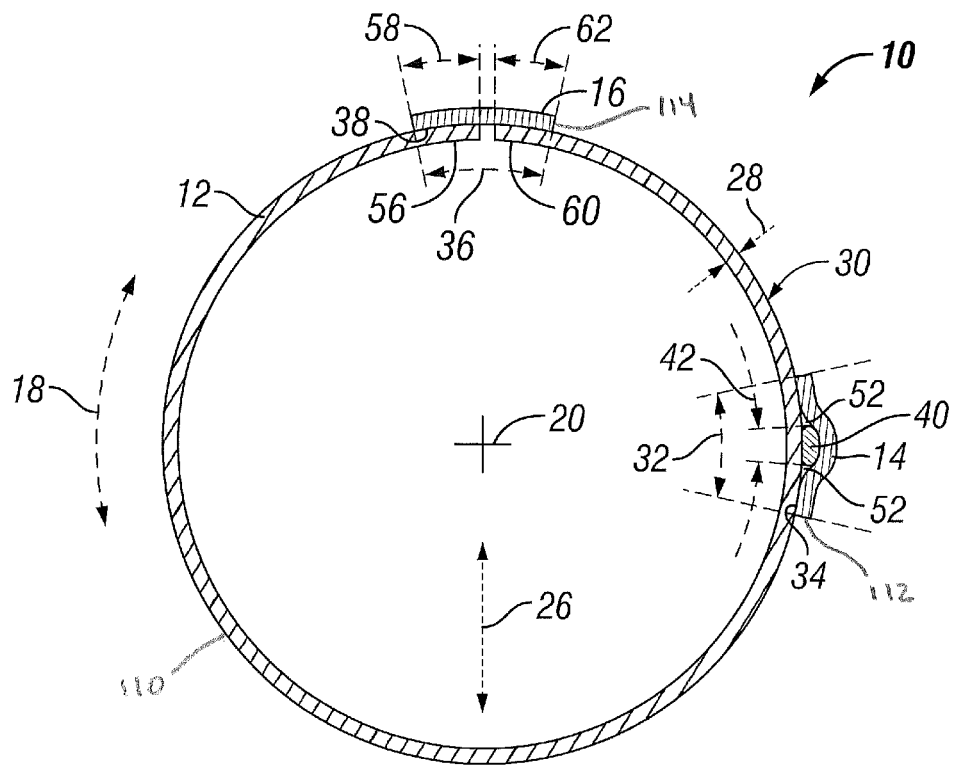
FIG. 8 is a cross-sectional side view of a snow sock with two thickness sections in which one has a fill element associated therewith and the other does not have a fill element associated therewith.

Another embodiment is shown with reference to FIG. 8 in which the covering 12 in this embodiment is made of but a single covering segment. A first thickness section 14 is located on the outer surface 30 and is spaced from the junction of the single covering segment in the circumferential direction 18. A first fill element 40 engages the outer surface 30 and is covered by the first thickness section 14 such that the first arc length 32 extends across the entire length 42. The first fill element 40 can be configured in manners previously discussed and a repeat of this information is not necessary.

A second thickness section 16 is also present and is located at the junction of the leading and tailing portions 56, 60 and connects these portion 56, 60 to one another. A second fill element 44 is not present at the second thickness section 16. The second thickness section 16 may lay against the outer surface 30 so that more than 50% of the second arc length 36 does not form with the outer surface 30 a void. The first and second thickness sections 14, 16 can be located any distance from one another in the circumferential direction 18, and need not be positioned at 180 degrees or 90 degrees from one another in various set ups. The extra thickness of the snow sock 10 afforded by the first thickness section 14 and first fill element 40, and the extra thickness afforded by the second thickness section 16 increases traction of the snow sock 10 when moving on ice and snow. The snow sock 10 can thus be arranged where none, some, or all of the thickness sections are in engagement with fill elements.

Figure 9:
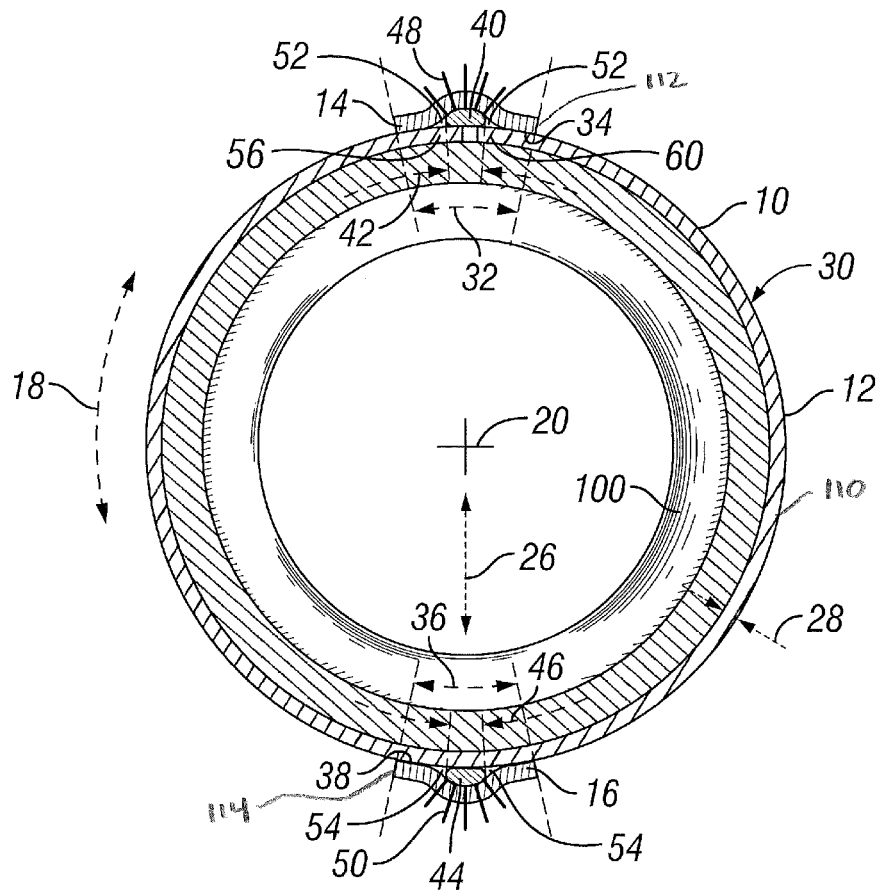
FIG. 9 is a cross-sectional side view of a snow sock on a tire that has fill elements and projections protruding therefrom.

FIG. 9 shows an alternate embodiment of the snow sock 10 that includes a pair of thickness sections 14, 16 with associated fill elements 40, 44. The fill elements 40, 44 in this embodiment include projections 48, 50 that aid in gripping the surface of snow and ice onto which the vehicle drives. The projections 48, 50 can be made of metal and may be spikes, nails, studs or other elements that could be more aggressive on the road surface than materials making up the covering 12 or thickness sections 14, 16. The projections 48, 50 could be made of the same material as the fill elements 40, 44 or may be made of different materials. The fill elements 40, 44 may thus be made of metal in some embodiments along with the projections 48, 50. In other embodiments, the fill elements 40, 44 are plastic while the projections 48, 50 are metal. The projections 48 extends out of the first fill element 40 in the radial direction 26 away from the axial center of the snow sock 10, and extend through the first thickness section 14 and are located radially outward from the first thickness section 14 in the radial direction 26. In a similar manner, the projections 50 extend out of the second fill element 44 and through the second thickness section 16 so as to be located outward from the second fill element 44 in the radial direction 26. The fill elements 40, 44 can be located inside of a pocket formed by the thickness sections 14, 16 and the covering 12 and need not be attached to the elements 12, 14, 16 via adhesives or mechanical fasteners.

Figure 10:
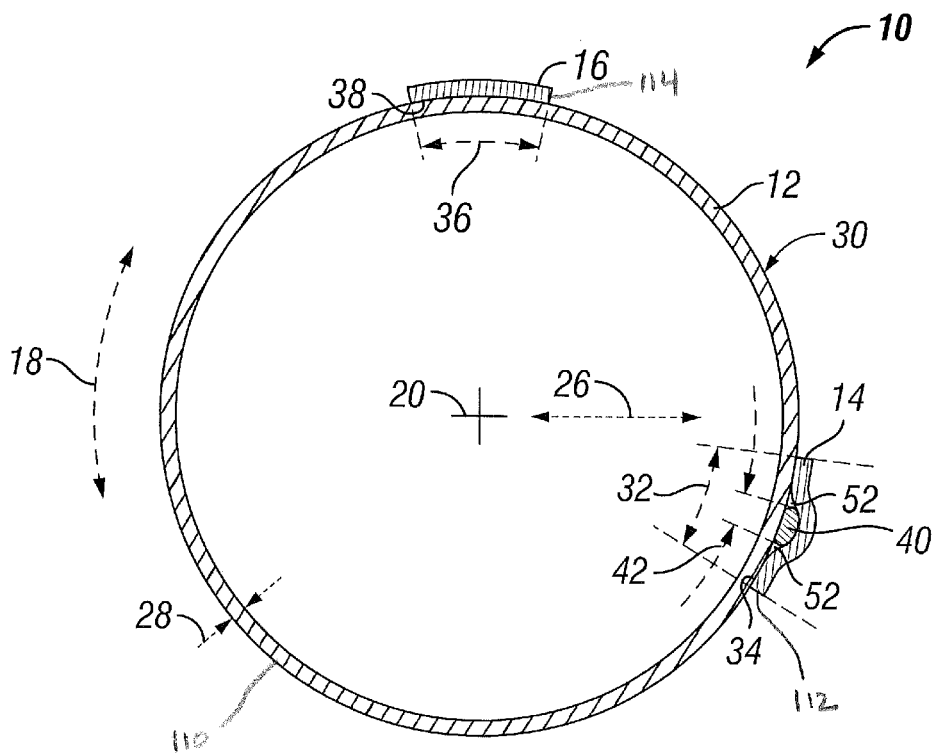
FIG. 10 is cross-sectional side view of a snow sock with thickness sections and a covering that lacks a single covering segment joined onto itself.

Another design of the snow sock 10 is shown in FIG. 10 in which the covering 12 is not made of a single component that is attached on opposite ends to itself via leading and tailing portions 56, 60. Instead, the covering 12 is formed as a single component without an attached junction so that it is integrally formed 360 degrees around the central axis 20. The first and second thickness sections 14, 16 are attached to the outer surface 30 and are spaced from one another and not contacting one another in the circumferential direction 18. A first fill element 40 is located between the first thickness section 14 and the covering 12, but a second fill element 44 is not present. Instead, the second thickness section inner surface 38 engages the outer surface 30 along the entire second arc length 36. It is to be understood that in other embodiments, the entire first thickness section inner surface 34 engages the outer surface 30 along the entire first arc length 32, and this type of configuration could be true for any other thickness sections present in the snow sock 10. In yet other embodiments, the covering 12 may include a single covering segment that is joined onto itself while the thickness sections 14, 16 are not located at this joining and do not function to join the single covering segment onto itself. In these embodiments, the thickness sections 14, 16 are spaced from the attachment of the covering segment in the circumferential direction 18.

Figure 11:
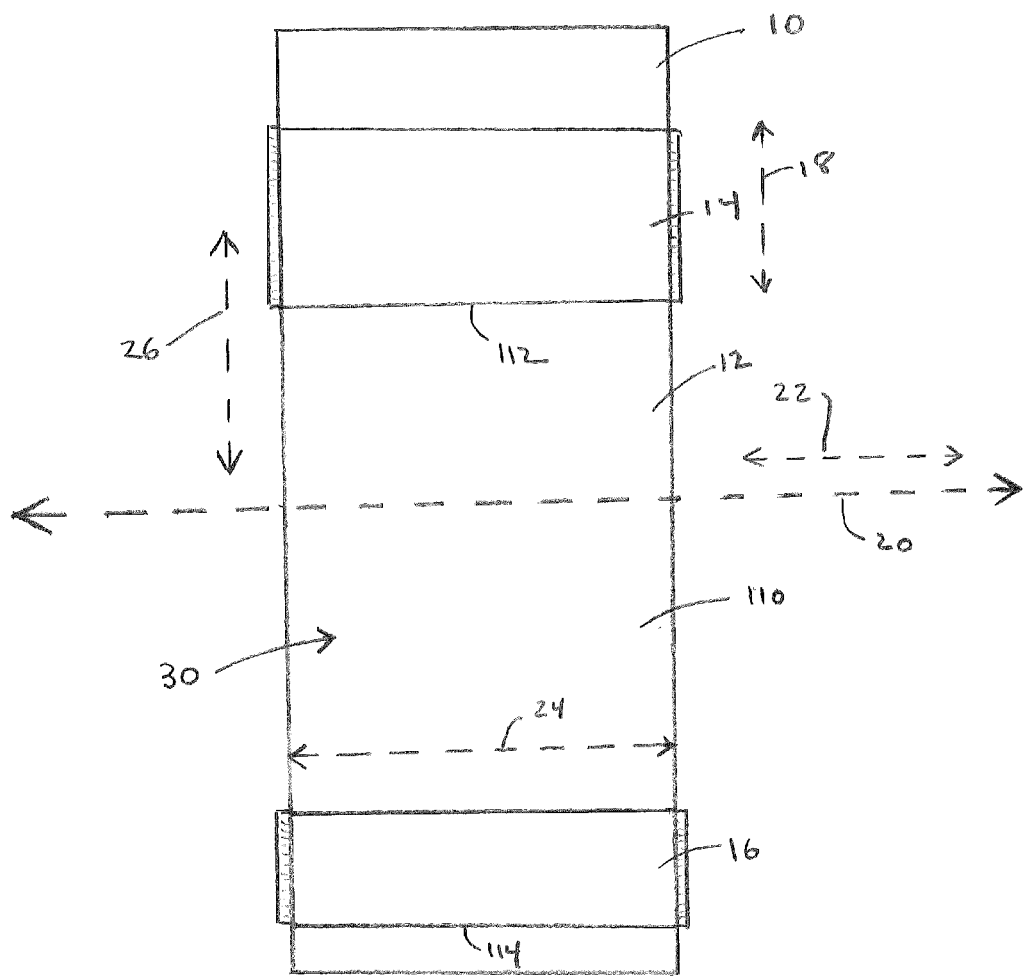
FIG. 11 is a front view of a snow sock in one exemplary embodiment.

FIG. 11 shows a front view of the snow sock 10 on a tire in which two thickness sections 14, 16 are visible. The snow sock 10 is arranged so that the outer surface 30 has an uncovered portion 110 that extends across the entire width 24 of the outer surface 30 along at least some portion of the extent of the covering 12 in the circumferential direction 18. Further, the first thickness section 14 has a straight leading terminal end 112 that extends across the entire width 24 and is substantially parallel to the axial direction 22. When described as being substantially parallel, the leading terminal end 112 can be oriented at an angle to the axial direction 22 that is from 0-5 degrees, from 5-10 degrees, from 10-15 degrees, from 15-20 degrees, up to 10 degrees, up to 15 degrees, or up to 20 degrees to the axial direction 22 so that it is still considered substantially parallel. These degrees may be measured by drawing a straight line from the left and right hand side of the leading terminal end 112 and then measuring this straight line angle to the axial direction 22 in case the leading terminal end 112 is not simply a straight line in and of itself. In other embodiments, the leading terminal end 112 is substantially parallel to the point that it is in fact completely parallel to the axial direction. The trailing terminal end of the first thickness section 14 could likewise be substantially parallel to the axial direction 22. When described as being straight, the leading terminal end 112 extends in a straight line across the entire width and does not undulate or curve, or extend at a V shaped angle or any other angle.

The second thickness section 16 has a straight leading terminal end 114 that extends across the entire width 24 and is substantially parallel to the axial direction 22. The substantially parallel orientation of the leading terminal end 114 could be measured as previously discussed with respect to the ranges mentioned regarding the leading terminal end 112 and a repeat of this information is not necessary. The leading terminal end 114 could likewise be parallel to the axial direction 22 as a leading end that is substantially parallel is also parallel. The trailing terminal end of the second thickness section 16 could also be substantially parallel to the axial direction 22 in some embodiments. As previously described, the width 24 is the width of the covering 12 in the axial direction 22 and does not include the portions of the covering 12 that are on the sides of the tire 100, but only those that cover the tread of the tire 100 which is the portion that is known as the tread width of the tire 100. As such, the covering 12 of the snow sock 10 as used herein may not include the sides of the snow sock 10 that extend down from the portion of the snow sock 10 that covers the tread of the tire 100. The width 24 thus does not include the sides of the covering 12, but only those portions of the covering 12 that cover the tread of the tire 100 and have a surface normal that extends in the radial direction 26 or is close to parallel to the radial direction 26.

Experiments have been conducted in order to determine the effect of adding thickness sections 14, 16, 68, 76, 82, 88, 94 to the covering 12. The vehicles evaluated include a traction device that can be turned on or turned off to limit sliding on snow and ice. For the first set of tests, the vehicles had this traction device turned on and the performance of the snow sock 10 from 0-10 km/hour was evaluated. Acceleration of the vehicle in this range with a single thickness section 14 was measured at 1.38 m/s$^2$, with two thickness sections 14, 16 to be 1.60 m/s$^2$, and with four thickness sections 14, 16, 68, 76 to be 1.57 m/s$^2$. As such, for vehicles that employ this traction device the number of thickness sections on the snow sock 10 did not have any impact on the traction of the snow sock 10 on ice and snow.

The traction device was then turned off and the snow socks 10 were reevaluated. With a single thickness section 14 the acceleration was measured at 0.83 m/s$^2$, with two thickness sections 14, 16 the acceleration was 1.1 m/s$^2$, with three thickness sections 14, 16, 68 the acceleration was 1.21 m/s$^2$, and with three thickness sections 14, 16, 68, 76 the acceleration was 1.46 m/s$^2$. Again, this acceleration was measured from 0-10 km/h thus being the acceleration at initial movement of the vehicle. The acceleration is related to the traction in that the higher the vehicle accelerates from 0-10 km/h the better/higher traction the vehicle has on the ice and snow. The experiments found that increasing the number of thickness sections 14, 16, 68, 76 causes an increase in the amount of traction the snow sock 10 provides such that for each thickness section 14, 16, 68, 76 added additional traction was realized by the snow sock 10.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. A snow sock, comprising:
a covering that extends in a circumferential direction around a central axis, wherein the covering has a width that extends in an axial direction, and wherein the covering has a thickness that extends in a radial direction, wherein the covering has an outer surface, wherein the outer surface is uncovered across the entire width of the outer surface along at least some portion of extent of the covering in the circumferential direction;
a first thickness section that extends in the circumferential direction along a first arc length about the central axis that is at least 5 degrees, wherein the first thickness section is carried by the covering, wherein the first thickness section has a first thickness section inner surface that engages the outer surface of the covering, wherein at least 50% of the first thickness section inner surface engages the outer surface of the covering, a first fill element, or a combination of the outer surface of the covering and the first fill element, wherein the first thickness section has a straight first thickness section leading terminal end that extends across the entire width of the outer surface and is substantially parallel to the axial direction; and
a second thickness section not contacting and spaced from the first thickness section in the circumferential direction, wherein the second thickness section extends in the circumferential direction along a second arc length about the central axis that is at least 5 degrees, wherein the second thickness section is carried by the covering, wherein the second thickness section has a second thickness section inner surface that engages the outer surface of the covering, wherein at least 50% of the second thickness section inner surface engages the outer surface of the covering, a second fill element, or a combination of the outer surface of the covering and the second fill element, wherein the second thickness section has a straight second thickness section leading terminal end that extends across the entire width of the outer surface and is substantially parallel to the axial direction; and
wherein the covering is a single covering segment that has a leading portion and a tailing portion that are attached to the first thickness section, wherein the leading portion has a leading portion terminal end that extends along an entire height of the covering in the radial direction and along the entire width of the covering in the axial direction, and wherein the tailing portion has a tailing portion terminal end that extends along the entire height of the covering in the radial direction and along the entire width of the covering in the axial direction, wherein a completely empty space is present at all locations between the leading portion terminal end and the tailing portion terminal end,
wherein the leading portion has an arc length that extends 5 degrees in the circumferential direction about the central axis, and wherein the tailing portion has an arc length that extends 5 degrees in the circumferential direction about the central axis,
and wherein the second thickness section is attached to the single covering segment at a location spaced from the leading portion and from the tailing portion in the circumferential direction.

2. The snow sock as set forth in claim 1, wherein at least 90% of the first thickness section inner surface engages the outer surface of the covering, the first fill element, or a combination of the outer surface of the covering and the first fill element;
wherein at least 90% of the second thickness section inner surface engages the outer surface of the covering, the second fill element, or a combination of the outer surface of the covering and the section fill element.

3. The snow sock as set forth in claim 2, wherein the entire first thickness section inner surface engages the outer surface of the covering, and wherein the entire second thickness section inner surface engages the outer surface of the covering.

4. The snow sock as set forth in claim 1, wherein the first thickness section and the second thickness section are successive on the outer surface such that no other object is between the first thickness section and the second thickness section in the circumferential direction, wherein the second thickness section and the first thickness section are separated at least 20 degrees from one another in the circumferential direction about the central axis.

5. The snow sock as set forth in claim 1, wherein the first thickness section leading terminal end is parallel to the axial direction; and wherein the second thickness section leading terminal end is parallel to the axial direction.

6. The snow sock as set forth in claim 1, wherein the first fill element is present and is located between the covering and the first thickness section, wherein the first thickness section extends across an entire length of the first fill element in the circumferential direction; and
wherein the second fill element is present and is located between the covering and the second thickness section, wherein the second thickness section extends across an entire length of the second fill element in the circumferential direction.

7. The snow sock as set forth in claim 6, wherein the first fill element is made of metal and has projections that extend through the first thickness section, wherein the second fill element is made of metal and has projections that extend through the second thickness section.

8. The snow sock as set forth in claim 6, wherein the first fill element is made of plastic and does not have any portion that extends through the first thickness section, wherein the second fill element is made of plastic and does not have any portion that extends through the second thickness section.

9. The snow sock as set forth in claim 1, further comprising a first fill element located between the covering and the first thickness section, wherein the first thickness section extends across an entire length of the first fill element in the circumferential direction,
wherein the covering, the first fill element, and the first thickness section define a void that is located on both sides of the first fill element in the circumferential direction; and
a second fill element located between the covering and the second thickness section, wherein the second thickness section extends across an entire length of the second fill element in the circumferential direction,
wherein the covering, the second fill element, and the second thickness section define a void that is located on both sides of the second fill element in the circumferential direction.

10. The snow sock as set forth in claim 1, wherein the first thickness section is made of rubber, and wherein the second thickness section is made of rubber.

11. The snow sock as set forth in claim 1, wherein the covering is made of the same material as the first thickness section, and wherein the covering is made of the same material as the second thickness section.

12. The snow sock as set forth in claim 1, further comprising:
a third thickness section not contacting and spaced from the first thickness section and the second thickness section in the circumferential direction, wherein the third thickness section extends in the circumferential direction about the central axis along a third arc length, wherein the third thickness section is carried by the covering and wherein the third thickness section has a third thickness section inner surface that engages the outer surface of the covering, wherein at least 50% of the third thickness section inner surface engages the outer surface of the covering, a third fill element, or a combination of the outer surface of the covering and the third fill element;
a fourth thickness section not contacting and spaced from the first, second and third thickness sections in the circumferential direction, wherein the fourth thickness section extends in the circumferential direction about the central axis along a fourth arc length, wherein the fourth thickness section is carried by the covering and wherein the fourth thickness section has a fourth thickness section inner surface that engages the outer surface of the covering, wherein at least 50% of the fourth thickness section inner surface engages the outer surface of the covering, a fourth fill element, or a combination of the outer surface of the covering and the fourth fill element;
a fifth thickness section not contacting and spaced from the first, second, third, and fourth thickness sections in the circumferential direction, wherein the fifth thickness section extends in the circumferential direction about the central axis along a fifth arc length, wherein the fifth thickness section is carried by the covering and wherein the fifth thickness section has a fifth thickness section inner surface that engages the outer surface of the covering, wherein at least 50% of the fifth thickness section inner surface engages the outer surface of the covering, a fifth fill element, or a combination of the outer surface of the covering and the fifth fill element;
a sixth thickness section not contacting and spaced from the first, second, third, fourth, and fifth thickness sections in the circumferential direction, wherein the sixth thickness section extends in the circumferential direction about the central axis along a sixth arc length, wherein the sixth thickness section is carried by the covering and wherein the sixth thickness section has a sixth thickness section inner surface that engages the outer surface of the covering, wherein at least 50% of the sixth thickness section inner surface engages the outer surface of the covering, a sixth fill element, or a combination of the outer surface of the covering and the sixth fill element;
a seventh thickness section not contacting and spaced from the first, second, third, fourth, fifth, and sixth thickness sections in the circumferential direction, wherein the seventh thickness section extends in the circumferential direction about the central axis along a seventh arc length, wherein the seventh thickness section is carried by the covering and wherein the seventh thickness section has a seventh thickness section inner surface that engages the outer surface of the covering, wherein at least 50% of the seventh thickness section inner surface engages the outer surface of the covering, a seventh fill element, or a combination of the outer surface of the covering and the seventh fill element; and
wherein the first thickness section, the second thickness section, the third thickness section, the fourth thickness section, the fifth thickness section, the sixth thickness section, and the seventh thickness section do not share any common positioning relative to the covering in the circumferential direction.

13. A snow sock, comprising:
a covering that extends in a circumferential direction around a central axis, wherein the covering has a width that extends in an axial direction, and wherein the covering has a thickness that extends in a radial direction, wherein the covering has an outer surface, wherein the outer surface is uncovered across the entire width of the outer surface along at least some portion of extent of the covering in the circumferential direction;
a first thickness section that extends in the circumferential direction along a first arc length about the central axis that is at least 5 degrees, wherein the first thickness section is carried by the covering, wherein the first thickness section has a first thickness section inner surface that engages the outer surface of the covering, wherein at least 50% of the first thickness section inner surface engages the outer surface of the covering, a first fill element, or a combination of the outer surface of the covering and the first fill element, wherein the first thickness section has a straight first thickness section leading terminal end that extends across the entire width of the outer surface and is substantially parallel to the axial direction; and
a second thickness section not contacting and spaced from the first thickness section in the circumferential direction, wherein the second thickness section extends in the circumferential direction along a second arc length about the central axis that is at least 5 degrees, wherein the second thickness section is carried by the covering, wherein the second thickness section has a second thickness section inner surface that engages the outer surface of the covering, wherein at least 50% of the second thickness section inner surface engages the outer surface of the covering, a second fill element, or a combination of the outer surface of the covering and the second fill element, wherein the second thickness section has a straight second thickness section leading terminal end that extends across the entire width of the outer surface and is substantially parallel to the axial direction;
a third thickness section not contacting and spaced from the first thickness section and the second thickness section in the circumferential direction, wherein the third thickness section extends in the circumferential direction about the central axis along a third arc length, wherein the third thickness section is carried by the covering and wherein the third thickness section has a third thickness section inner surface that engages the outer surface of the covering, wherein greater than 50% of the third arc length of the third thickness section does not define with the covering a void,
wherein the covering has a leading terminal end that extends along the entire thickness of the covering in the radial direction and along the entire width of the covering in the axial direction, and wherein the covering has a tailing terminal end that extends along the entire thickness of the covering in the radial direction and along the entire width of the covering in the axial direction, wherein a completely empty space is present at all locations between the leading terminal end and the tailing terminal end.

14. A snow sock, comprising:
a covering that extends in a circumferential direction around a central axis, wherein the covering has a width that extends in an axial direction, and wherein the covering has a thickness that extends in a radial direction, wherein the covering has an outer surface, wherein the outer surface is uncovered across the entire width of the outer surface along at least some portion of extent of the covering in the circumferential direction;
a first thickness section that extends in the circumferential direction along a first arc length about the central axis that is at least 5 degrees, wherein the first thickness section is carried by the covering, wherein the first thickness section has a first thickness section inner surface that engages the outer surface of the covering, wherein at least 50% of the first thickness section inner surface engages the outer surface of the covering, a first fill element, or a combination of the outer surface of the covering and the first fill element, wherein the first thickness section has a straight first thickness section leading terminal end that extends across the entire width of the outer surface and is substantially parallel to the axial direction; and
a second thickness section not contacting and spaced from the first thickness section in the circumferential direction, wherein the second thickness section extends in the circumferential direction along a second arc length about the central axis that is at least 5 degrees, wherein the second thickness section is carried by the covering, wherein the second thickness section has a second thickness section inner surface that engages the outer surface of the covering, wherein at least 50% of the second thickness section inner surface engages the outer surface of the covering, a second fill element, or a combination of the outer surface of the covering and the second fill element, wherein the second thickness section has a straight second thickness section leading terminal end that extends across the entire width of the outer surface and is substantially parallel to the axial direction;
wherein the covering has a first covering segment and a second covering segment, wherein the first thickness section is attached to both the first covering segment and the second covering segment, wherein the second thickness section is attached to both the first covering segment and the second covering segment and is free from engagement with the first thickness section, and wherein the first thickness section and the second thickness section do not share any common positioning relative to the covering in the circumferential direction;
wherein the first covering segment has a first covering segment terminal end that extends along the entire thickness of the covering in the radial direction and along the entire width of the covering in the axial direction, and wherein the second covering segment has a second covering segment terminal end that extends along the entire thickness of the covering in the radial direction and along the entire width of the covering in the axial direction, wherein a completely empty space is present at all locations between the first covering segment terminal end and the second covering segment terminal end.

15. A snow sock, comprising:
a covering that extends in a circumferential direction around a central axis, wherein the covering has a width that extends in an axial direction, and wherein the covering has a thickness that extends in a radial direction, wherein the covering has an outer surface, wherein the outer surface is uncovered across the entire width of the outer surface along at least some portion of extent of the covering in the circumferential direction;
a first thickness section that extends in the circumferential direction along a first arc length about the central axis that is at least 5 degrees, wherein the first thickness section is carried by the covering, wherein the first thickness section has a first thickness section inner surface that engages the outer surface of the covering, wherein at least 50% of the first thickness section inner surface engages the outer surface of the covering, a first fill element, or a combination of the outer surface of the covering and the first fill element, wherein the first thickness section has a straight first thickness section leading terminal end that extends across the entire width of the outer surface and is substantially parallel to the axial direction; and
a second thickness section not contacting and spaced from the first thickness section in the circumferential direction, wherein the second thickness section extends in the circumferential direction along a second arc length about the central axis that is at least 5 degrees, wherein the second thickness section is carried by the covering, wherein the second thickness section has a second thickness section inner surface that engages the outer surface of the covering, wherein at least 50% of the second thickness section inner surface engages the outer surface of the covering, a second fill element, or a combination of the outer surface of the covering and the second fill element, wherein the second thickness section has a straight second thickness section leading terminal end that extends across the entire width of the outer surface and is substantially parallel to the axial direction;
a third thickness section not contacting and spaced from the first thickness section and the second thickness section in the circumferential direction, wherein the third thickness section extends in the circumferential direction about the central axis along a third arc length, wherein the third thickness section is carried by the covering and wherein the third thickness section has a third thickness section inner surface that engages the outer surface of the covering, wherein at least 50% of the third thickness section inner surface engages the outer surface of the covering, a third fill element, or a combination of the outer surface of the covering and the third fill element;
wherein the covering has a first covering segment, a second covering segment, and a third covering segment;
wherein the first thickness section is attached to both the first covering segment and the third covering segment,
wherein the second thickness section is attached to both the first covering segment and the second covering segment and is free from engagement with the first thickness section and the third thickness section,
wherein the third thickness section is attached to both the second covering segment and the third covering segment and is free from engagement with the first thickness section, and wherein the first thickness section, the second thickness section, and the third thickness section do not share any common positioning relative to the covering in the circumferential direction;
wherein the covering has a leading terminal end that extends along the entire thickness of the covering in the radial direction and along the entire width of the covering in the axial direction, and wherein the covering has a tailing terminal end that extends along the entire thickness of the covering in the radial direction and along the entire width of the covering in the axial direction, wherein a completely empty space is present at all locations between the leading terminal end and the tailing terminal end;
a fill element located between the covering and the first thickness section, wherein the first thickness section extends across an entire length of the fill element in the circumferential direction, wherein the fill element directly faces the completely empty space.

* * * * *